(12) United States Patent
Chou et al.

(10) Patent No.: US 8,240,228 B2
(45) Date of Patent: Aug. 14, 2012

(54) MANIPULATOR

(75) Inventors: Yu-Cheng Chou, Taipei Hsien (TW);
Jin-Xin Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 508 days.

(21) Appl. No.: 12/430,991

(22) Filed: Apr. 28, 2009

(65) Prior Publication Data

US 2010/0171246 A1 Jul. 8, 2010

(30) Foreign Application Priority Data

Jan. 5, 2009 (CN) .......................... 2009 1 0300035

(51) Int. Cl.
*G05G 9/047* (2006.01)
(52) U.S. Cl. .................................. 74/471 XY
(58) Field of Classification Search ............. 74/471 XY, 74/471 R, 490.01, 490.05, 490.06; 463/38; 200/6 A; 267/137; 33/644; 403/149, 166, 403/229, 304; 411/544
See application file for complete search history.

(56) References Cited

U.S. PATENT DOCUMENTS

| 2,563,976 | A | * | 8/1951 | Torosian | 411/544 |
| 4,315,113 | A | * | 2/1982 | Fisher et al. | 200/5 R |
| 4,739,128 | A | * | 4/1988 | Grisham | 200/6 A |
| 5,216,422 | A | * | 6/1993 | Kaye | 341/20 |
| 5,349,881 | A | * | 9/1994 | Olorenshaw et al. | 74/471 XY |
| 5,499,041 | A | * | 3/1996 | Brandenburg et al. | 345/174 |
| 2004/0211094 | A1 | * | 10/2004 | Seavey | 37/234 |

FOREIGN PATENT DOCUMENTS

DE 10301269 A1 7/2004

* cited by examiner

*Primary Examiner* — Robert A Siconolfi
*Assistant Examiner* — Stephen Bowes
(74) *Attorney, Agent, or Firm* — Altis Law Group, Inc.

(57) ABSTRACT

A manipulator includes a base, a flange, a connecting arm, a plurality of elastic members, and a plurality of fasteners. The elastic members is positioned between the base and the connecting arm. The fasteners are movably connected to the connecting arm, and fixedly connected to the base.

16 Claims, 3 Drawing Sheets

MANIPULATOR

BACKGROUND

1. Technical Field

The present disclosure relates generally to manipulators and, more particularly, to a multi-directional manipulator.

2. Description of Related Art

A manipulator is widely used in the manufacturing industry to achieve high machining efficiency. The manipulator is generally assembled to a machine tool. However, the manipulator may collide with other components of the machine tool, such as a worktable, during machining, potentially damaging the manipulator.

A pressure sensor can be assembled to the manipulator to avoid the collision of the manipulator and the worktable. When the manipulator touches the worktable, the pressure sensor produces a warning signal, and transfers the warning signal to a controller. The controller controls the manipulator to move away from the worktable, and resumes machining.

However, the manipulator needs both the pressure sensor and the controller to prevent the manipulator from colliding with the worktable. Therefore, a manufacturing cost of the manipulator is high.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
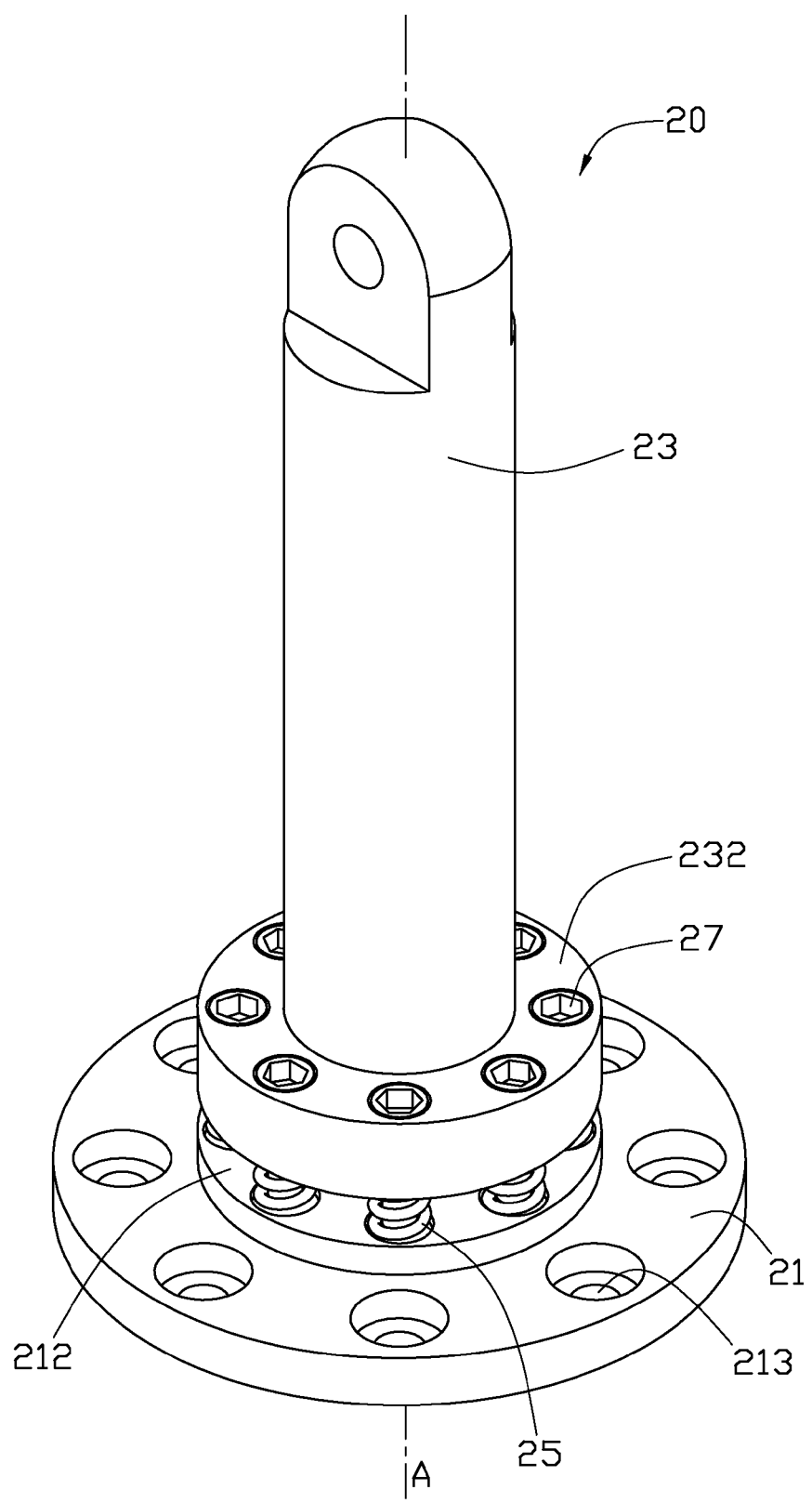
FIG. 1 is an assembled, isometric view of an embodiment of a manipulator.
Figure 2:
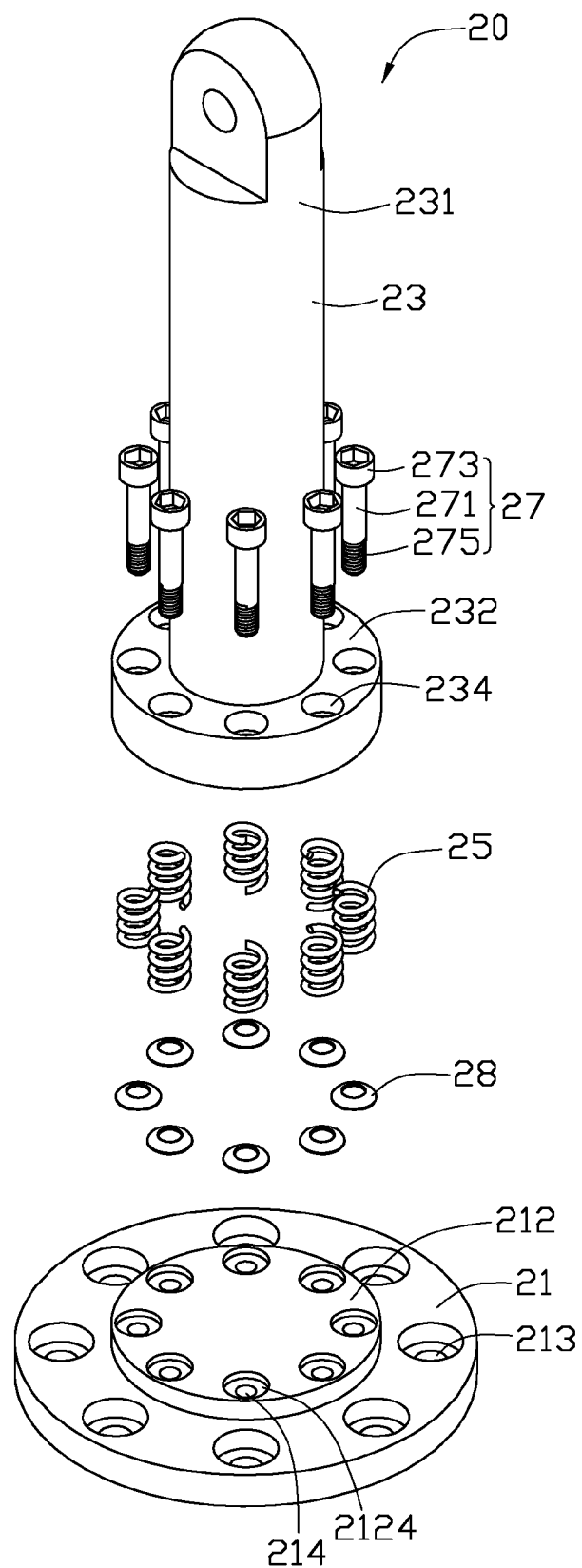
FIG. 2 is an exploded, isometric view of the manipulator of FIG. 1.

Referring to FIGS. 1 and 2, an exemplary embodiment of a manipulator 20 includes a base 21, a connecting arm 23, a plurality of resilient members 25, a plurality of fasteners 27, and a plurality of spring washers 28. While in the illustrated exemplary embodiment, the manipulator 20 includes eight elastic members 25, eight fasteners 27, and eight spring washers 28, the manipulator 20 may include as few as three elastic members 25, three fasteners 27, and three spring washers 28.

The base 21 defines a plurality of assembling holes 213 in a periphery of the base 11, configured to be connected to a moving shaft of a machine tool (not shown). A supporting portion 212 is formed on a center portion of the base 21. The base 21 further defines a plurality of evenly distributed threaded holes 214 in a periphery of the supporting portion 212. The supporting portion 212 defines a plurality of receiving grooves 2124. The receiving grooves 2124 communicate with the threaded holes 214 correspondingly. In the illustrated embodiment, the base 21 and the supporting portion 212 are cylindrical.

Referring to FIG. 2, the connecting arm 23 includes a rod 231 and a connecting portion 232 formed towards an end of the rod 231. An end of the rod 231 opposite to the connecting portion 232 is configured to connect with a holding device to firmly hold a workpiece (not shown). The connecting portion 232 defines a plurality of evenly distributed stepped holes 234 corresponding to the threaded holes 214. Each stepped hole 234 includes a first receiving hole 2343, a second receiving hole 2345, and a connecting hole 2341 communicating the first receiving hole 2343 with the second receiving hole 2345. In the illustrated embodiment, the connecting arm 23 is substantially cylindrical shaped, and has an axis A. The elastic members 25 are compression springs.

Each fastener 27 includes a guiding portion 271, a resisting portion 273, and a threaded portion 275. The resisting portion 273 and the threaded portion 275 are formed on opposite ends of the guiding portion 271. The guiding portion 271 is cylindrical. A diameter of the guiding portion 271 is slightly smaller than that of the connecting hole 2341. A spacing between the guiding portion 271 and a side wall of the connecting hole 2341 can be about 0.2 millimeters. The resisting portion 273 defines a hexagonal engaging groove (not labeled).

Figure 3:
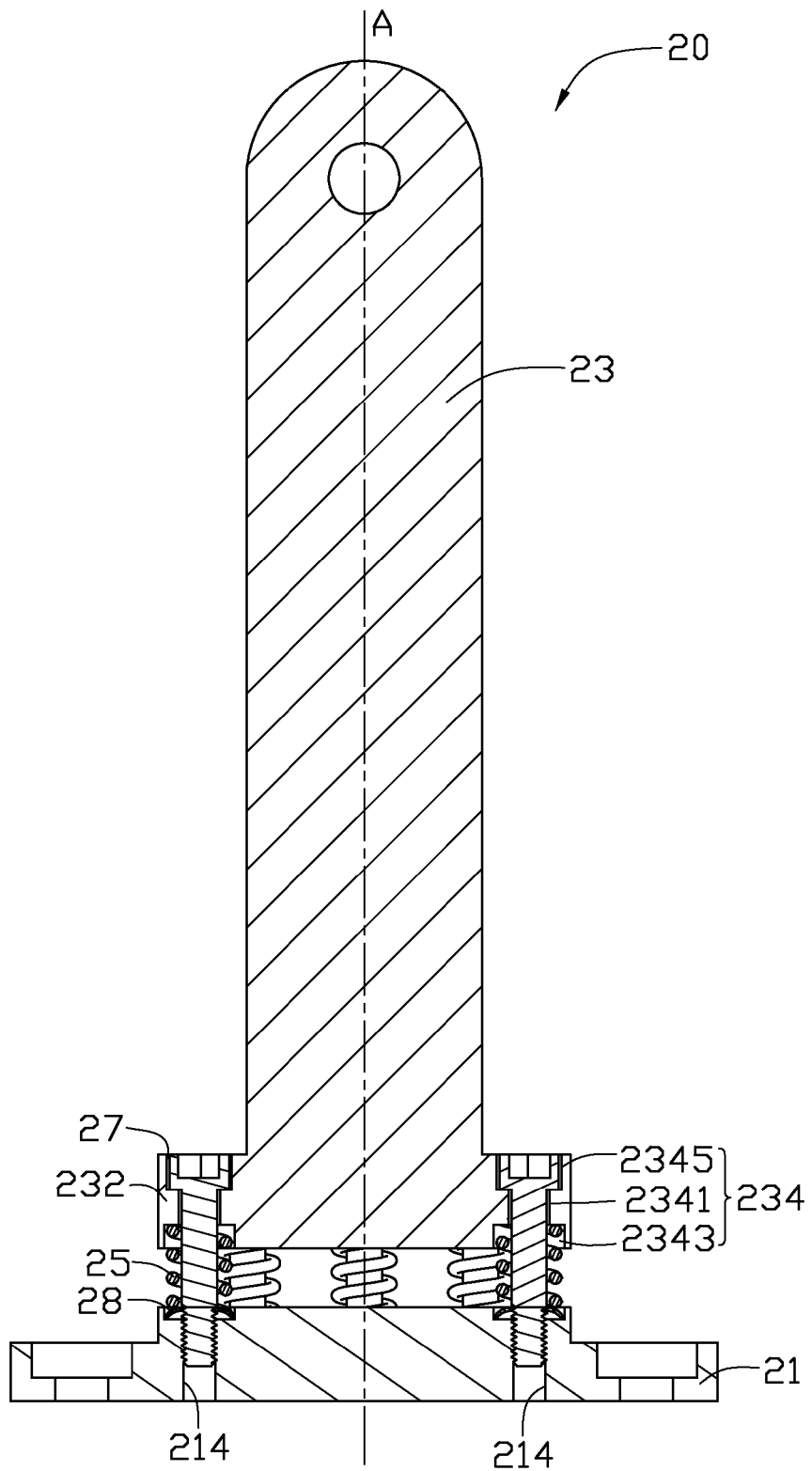
FIG. 3 is a cross-sectional view of the manipulator of FIG. 1.

Referring to FIGS. 1 through 3, in assembling the manipulator 20, the spring washers 28 are received in the receiving grooves 2124 of the base 21 correspondingly. The elastic members 25 are partially received in the receiving groove 2124 of the base 21, and located on the spring washers 28 correspondingly. Each fastener 27 extends through one stepped hole 234 of the connecting arm 23, one elastic member 25, one spring washer 28, and engages in one threaded hole 214 of the base 21 correspondingly. The resisting portions 273 of the fasteners 27 are received in the second receiving holes 2345 of the connecting arm 23. The elastic members 25 are compressed and partially received in the first receiving holes 2343 of the connecting arm 23. After that, the connecting arm 23 is perpendicular to the base 21. Furthermore, a position of the connecting arm 23 relative the base 21 can deviate slightly due to the spacing between the guiding portion 271 of the fastener 27 and the connecting arm 23.

To ensure that the connecting arm 23 is perpendicular to the base 21, a testing device, such as a level tester, is used to calibrate a positioning of the connecting arm 23 relative the base 21. The positioning of the connecting arm 23 can be changed by adjusting one or more fasteners 27.

In use, the claw for clutching the workpiece is mounted to the connecting arm 23. The base 21 is assembled on the driver of the machine tool. FIG. 3 shows the manipulator 20 in a normal position. When the rod 231 of the connecting arm 23 collides against other components of the machine tool, such as a worktable, the position of the connecting arm 23 relative the base 21 deviates at a slight angle permitted by the spacing defined between the fastener 27 and the connecting arm 23. The elastic members 25 and the spring washers 28 absorbs a resistance force between the connecting arm 23 and the worktable and deforms, thus preventing the connecting arm 23 from damage.

When the connecting arm 23 becomes freed from the worktable, the collision force is removed. The connecting arm 23 returns to the normal position due to the elastic members 25 and the spring washers 28, as the elastic members 25 and the spring washers 28 restores. When the connecting arm 23 is perpendicular to the base 21 again, the elastic members 25 and the spring washers 28 returns to the normal state and the connecting arm 23 is stably supported. Moreover, the elastic members 25 and the spring washers 28 are uniformly arranged in a circular manner. Therefore, the elastic force produced by the elastic members 25 and the spring washers 28 act on the connecting arm 23 evenly, so that the connecting arm 23 can deviate in multi-directions.

The connecting arm 23 is not easily damaged by a collision between the connecting arm 23 and the worktable because the elastic members 25 and the spring washers 28 absorbs the resistance force between the worktable and the connecting arm 23. In addition, when the position of the connecting arm 23 deviates, the elastic members 25 mainly provide an elastic force to return the connecting arm 23 to the normal position, and the spring washers 28 main provide an elastic force to hold the connecting arm 23 in the original position. When the connecting arm 23 is perpendicular to the base 21, that is, in the original position, a direction of a composition elastic force produced by the elastic members 25 and spring washers 28 is parallel to the symmetrical axis A of the connecting arm 23. Therefore, a resetting precision of the connecting arm 23 is high. In the illustrated embodiment, a resetting precision of the connecting arm 23 back to the original position is 0.02 millimeters or less in any direction. Furthermore, the elastic members 25 are uniformly arranged in a circular manner, thus improving a structural strength and stability of the manipulator 20.

In an alternative embodiment, the manipulator 20 does not include spring washers 28. In this case, a resetting precision of the manipulator 20 is 0.05 millimeters or less.

It should be pointed out that the fastener 27 may be fixedly connected with the connecting arm 23 and through the base 21. The manipulator 20 may include three or more fasteners 27, and the fasteners 27 are arranged in a circular manner. The manipulator 20 may only includes one or more elastic members 25 and one or more spring washers 28 for producing the elastic force. The elastic members 25 may not be sleeved on the fasteners 27, but positioned in a circular manner between the connecting arm 23 and the base 21. In addition, the elastic members 25 may only sleeve on some of the fasteners 27. The spacing between the guiding portion 271 and a side wall of the connecting hole 2341 may be changed according to a swinging range of the connecting arm 23.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A manipulator, comprising:
a base;
a connecting arm comprising a rod and a connecting portion formed on an end of the rod;
at least one elastic member positioned between the base and the connecting arm;
at least one spring washer positioned between the base and the at least one elastic member; and
at least three fasteners, wherein each of the at least three fasteners is fixedly connected to one of the base and the connecting arm, and movably connected to the other one of the base and the connecting arm;
wherein the at least one elastic member and the at least one spring washer are sleeved on one of the at least three fasteners, and the at least one elastic member abuts against the at least one spring washer.

2. The manipulator of claim 1, wherein the elastic member is a compression spring.

3. The manipulator of claim 1, wherein the rod is substantially cylindrical.

4. The manipulator of claim 1, wherein each of the at least three fasteners comprises a guiding portion, a resisting portion, and a threaded portion; the resisting portion and the threaded portion are formed on opposite ends of the guiding portion; the guiding portion extends through the connecting portion of the connecting arm.

5. The manipulator of claim 4, wherein the base defines a plurality of threaded holes; the threaded portions engaging the threaded holes.

6. The manipulator of claim 4, wherein the connecting portion defines a plurality of receiving holes, the resisting portion of each fastener is received in one receiving hole.

7. The manipulator of claim 1, wherein diameters of the at least one spring washer increase from a top end to a bottom end of the at least one spring washer, the top end abuts against the at least one elastic member.

8. A manipulator, comprising:
a base;
a connecting arm;
at least three fasteners, the at least three fasteners connecting the connecting arm with the base, and a spacing formed between each of the at least three fasteners and the connecting arm;
at least three elastic members, each elastic member sleeved over one of the at least three fasteners; and
at least three spring washers positioned between the base and the at least three elastic members, wherein each of the at least three spring washers is sleeved over each of the at least three fasteners, and each of the at least three elastic members abuts against each of the at least three spring washers.

9. The manipulator of claim 8, wherein the connecting arm defines at least three stepped holes, the at least three fasteners are engaged in the at least three stepped holes, respectively, and the spacing is formed between each fastener and a sidewall of each stepped hole.

10. The manipulator of claim 8, wherein the spacing between each of the at least three fasteners and the connecting arm is 0.2 millimeters.

11. The manipulator of claim 8, wherein the at least three fasteners are evenly arranged in a circular manner.

12. The manipulator of claim 8, wherein the three elastic members are compression springs.

13. The manipulator of claim 8, wherein the connecting arm includes a rod and a connecting portion formed on an end of the rod.

14. The manipulator of claim 13, wherein the rod is substantially cylindrical.

15. The manipulator of claim 13, wherein each of at least three fasteners comprises a guiding portion, a resisting portion, and a threaded portion; the resisting portion and the threaded portion are formed on opposite ends of the guiding portion; the guiding portion extends through the connecting portion of the connecting arm, and the spacing is formed between the guiding portion and the connecting portion.

16. The manipulator of claim 8, wherein diameters of each of the at least three spring washers increase from a top end to a bottom end of each of the at least three spring washers, the top end abuts against each of the at least three elastic members.

* * * * *